United States Patent
Seiler et al.

(10) Patent No.: US 8,500,892 B2
(45) Date of Patent: Aug. 6, 2013

(54) CO₂ ABSORPTION FROM GAS MIXTURES USING AN AQUEOUS SOLUTION OF 4-AMINO-2,2,6,6-TETRAMETHYLPIPERIDINE

(75) Inventors: Matthias Seiler, Griesheim (DE); Jörn Rolker, Alzenau (DE); Rolf Schneider, Gründau-Rothenbergen (DE); Bernd Glöckler, Rodenbach (DE); Axel Kobus, Langen (DE); Wolfgang Benesch, Bochum (DE); Thomas Riethmann, Essen (DE); Hermann Winkler, Recklinghausen (DE); Jens Reich, Mühlheim an der Ruhr (DE); Helmut Brüggemann, Moers (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 13/147,198

(22) PCT Filed: Jan. 29, 2010

(86) PCT No.: PCT/EP2010/051083
§ 371 (c)(1),
(2), (4) Date: Oct. 9, 2011

(87) PCT Pub. No.: WO2010/089257
PCT Pub. Date: Aug. 12, 2010

(65) Prior Publication Data
US 2012/0017762 A1 Jan. 26, 2012

(30) Foreign Application Priority Data
Feb. 2, 2009 (DE) .......................... 10 2009 000 543

(51) Int. Cl.
*B01D 47/00* (2006.01)
(52) U.S. Cl.
USPC ................... 96/234; 95/187; 95/203; 95/236; 252/184
(58) Field of Classification Search
USPC .............. 95/187, 203, 236; 96/234; 252/184
See application file for complete search history.

(56) References Cited

U.S. PATENT DOCUMENTS

| | | |
|---|---|---|
| 1,882,258 A | 10/1932 | Randel |
| 2,516,625 A | 7/1950 | Haury |
| 2,601,673 A | 6/1952 | McMillan et al. |
| 2,802,344 A | 8/1957 | Witherell |
| 4,106,904 A | 8/1978 | Oude Alink et al. |
| 4,152,900 A | 5/1979 | Chopra et al. |
| 4,152,901 A | 5/1979 | Munters |
| 4,251,494 A | 2/1981 | Say |
| 4,360,363 A | 11/1982 | Ferrin et al. |
| 4,466,915 A * | 8/1984 | Lai ................................ 540/492 |
| 4,701,530 A | 10/1987 | Swearingen et al. |
| 4,714,597 A | 12/1987 | Trevino |
| 5,126,189 A | 6/1992 | Tanny et al. |
| 5,186,010 A | 2/1993 | Wehr |
| 5,873,260 A | 2/1999 | Linhardt et al. |
| 6,130,347 A * | 10/2000 | Julius et al. .................... 558/342 |
| 6,155,057 A | 12/2000 | Angell et al. |
| 6,727,015 B1 | 4/2004 | Putter et al. |
| 7,419,646 B2 | 9/2008 | Cadours et al. |
| 7,435,318 B2 | 10/2008 | Arlt et al. |
| 8,069,687 B2 | 12/2011 | Jork et al. |
| 8,357,344 B2 | 1/2013 | Bouillon et al. |
| 2004/0133058 A1 | 7/2004 | Arlt et al. |
| 2005/0070717 A1 | 3/2005 | Wasserscheid et al. |
| 2005/0129598 A1 | 6/2005 | Chinn |
| 2005/0245769 A1 * | 11/2005 | Kohler et al. ................. 568/596 |
| 2006/0104877 A1 * | 5/2006 | Cadours et al. ............... 423/226 |

(Continued)

FOREIGN PATENT DOCUMENTS

| | | |
|---|---|---|
| DE | 400 488 | 8/1924 |
| DE | 633 146 | 7/1936 |

(Continued)

OTHER PUBLICATIONS

English language translation of the International Search Report for PCT/EP2010/051083 filed Jan. 29, 2010.
English language translation of the Written Opinion of the International Searching Authority for PCT/EP2010/051083 filed Jan. 29, 2010.
Demand filed by PCT applicant including arguments in response to Written Opinion, 2010.
Amended claims filed, 2010.

(Continued)

*Primary Examiner* — Christopher P Jones
(74) *Attorney, Agent, or Firm* — Law Office of: Michael A. Sanzo, LLC

(57) ABSTRACT

$CO_2$ is absorbed from a gas mixture by bringing the gas mixture into contact with an absorbent that comprises water and at least one amine of the formula (I), wherein $R^1$ and $R^2$, independently of each other, are hydrogen or an alkyl group. According to the invention, absorption media comprise sulfolane or an ionic liquid in addition to water and an amine of the formula (I). A device according to the invention for removing $CO_2$ from a gas mixture comprises an absorption unit, a desorption unit, and an absorption medium according to the invention that is conducted in the circuit.

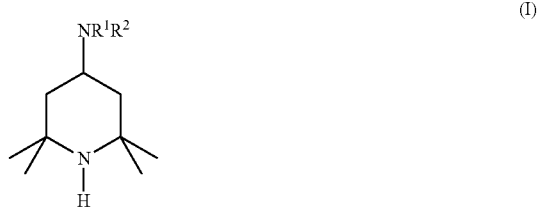

(I)

19 Claims, No Drawings

U.S. PATENT DOCUMENTS

| | | |
|---|---|---|
| 2006/0150665 A1 | 7/2006 | Weimer et al. |
| 2006/0197053 A1 | 9/2006 | Shiflett et al. |
| 2006/0251961 A1 | 11/2006 | Olbert et al. |
| 2007/0264180 A1* | 11/2007 | Carrette et al. ............... 423/228 |
| 2007/0286783 A1 | 12/2007 | Carrette et al. |
| 2008/0028777 A1 | 2/2008 | Boesmann et al. |
| 2008/0283383 A1 | 11/2008 | Ruffert et al. |
| 2009/0029121 A1* | 1/2009 | Hammermann et al. .. 428/195.1 |
| 2009/0199709 A1 | 8/2009 | Rojey et al. |
| 2010/0011958 A1* | 1/2010 | Cadours et al. ................. 95/187 |
| 2010/0095703 A1 | 4/2010 | Jork et al. |
| 2010/0104490 A1 | 4/2010 | Bouillon et al. |
| 2010/0288126 A1 | 11/2010 | Agar et al. |
| 2010/0326126 A1 | 12/2010 | Seiler et al. |
| 2011/0000236 A1 | 1/2011 | Seiler et al. |
| 2011/0081287 A1 | 4/2011 | Bouillon et al. |
| 2012/0080644 A1 | 4/2012 | Seiler et al. |
| 2012/0247144 A1 | 10/2012 | Seiler et al. |
| 2012/0308458 A1 | 12/2012 | Seiler et al. |
| 2013/0031930 A1 | 2/2013 | Seiler et al. |
| 2013/0031931 A1 | 2/2013 | Seiler et al. |

FOREIGN PATENT DOCUMENTS

| | | |
|---|---|---|
| DE | 36 23 680 A1 | 1/1988 |
| DE | 266 799 A1 | 4/1989 |
| DE | 195 11 709 | 10/1996 |
| DE | 103 33 546 | 2/2005 |
| DE | 10 2004 053 167 | 5/2006 |
| DE | 10 2005 013 030 | 9/2006 |
| DE | 10 2006 036228 A1 | 2/2008 |
| EP | 0 033 529 A1 | 1/1981 |
| EP | 0 302 020 | 2/1989 |
| FR | 2 898 284 A1 | 9/2007 |
| FR | 2 900 841 A1 | 11/2007 |
| FR | 2 900 842 A1 | 11/2007 |
| JP | 61-129019 | 6/1986 |
| JP | 2-298767 | 12/1990 |
| JP | 4-268176 | 9/1992 |
| JP | 7-167521 | 7/1995 |
| WO | WO 93/13367 | 7/1993 |
| WO | WO 02/074718 | 9/2002 |
| WO | WO 03/074494 | 9/2003 |
| WO | WO 2004/104496 | 12/2004 |
| WO | WO 2005/113702 | 12/2005 |
| WO | WO 2006/084262 | 8/2006 |
| WO | WO 2006/134015 | 12/2006 |
| WO | WO 2008/015217 | 2/2008 |
| WO | WO 2009/097930 | 8/2009 |
| WO | WO 2009/098155 | 8/2009 |
| WO | WO 2012/062830 | 5/2012 |
| WO | WO 2012/168067 | 12/2012 |
| WO | WO 2012/168094 | 12/2012 |
| WO | WO 2012/168095 | 12/2012 |

OTHER PUBLICATIONS

English language translation of the International Preliminary Report on Patentability for PCT/EP2010/051083 filed Jan. 29, 2010.

Brennecke, et al., "Ionic Liquids: Innovative Fluids for Chemical Processing," *AIChE Journal* 47(11):2384-2389 (2001).

Chua, et al., "Improved Thermodynamic Property Fields of LiBr-H$_2$O Solution," *International Journal of Refrigeration* 23:412-429 (2000).

Glebov, et al., "Experimental Study of Heat Transfer Additive Influence on the Absorption Chiller Performance," *International Journal of Refrigeration* 25:538-545 (2002).

Kim, et al., "Performance Evaluation of Absorption Chiller Using LiBr + H$_2$N(CH$_2$)$_2$OH + H$_2$O, LiBr + HO(CH$_2$)$_3$OH + H$_2$O, and LiBr + (HOCH$_2$CH$_2$NH + H$_2$O as Working Fluids," *Applied Thermal Engineering* 19:217-225 (1999).

Kim, et al., "Refractive Index and Heat Capacity of 1-Butyl-3-Methylimidazolium Bromide and 1-Butyl-3-Methylimidazolium Tetrafluoroborate, and Vapor Pressure of Binary Systems for 1-Butyl-3-Methylimidazolium Tetrafluoroborate—Trifluoroethanol," *Fluid Phase Equilibria* 218:215-220 (2004).

Rolker, et al., "Abtrennung von Kohlendioxid aus Rauchgasen mittels Absorption," *Chemie Ingenieur Technik* 78:416-424 (2006).

Wu, et al., "Novel Ionic Liquid Thermal Storage for Solar Thermal Electric Power Systems," *Proceeding of Solar Forum. Solar Energy: The Power to Choose* Apr. 21-25, 2001.

Yoon, et al., "Cycle Analysis of Air-Cooled Absorption Chiller Using a New Working Solution," *Energy* 24:795-809 (1999).

Zhang, et al., "Screening of ionic Liquids to Capture CO2 by COSMO-RS and Experiments," *AIChE Journal* 54(10):2171-2728 (Oct. 2008).

Ziegler, et al., "Heat-Transfer Enhancement by Additives," *International Journal of Refrigeration* 19:301-309 (1996).

Ziegler, et al., "Multi-effect absorption chillers," *Rev. Int. Froid* 16(5):301-311 (1993).

English language abstract for DD 266 799 A1, 1989.

English language text for DE 400 488, 1924.

English language text for DE 633 146, 1936.

English language abstract for DE 36 23 680, 1988.

English language abstract for DE 195 11 709, 1996.

English language abstract for DE 103 33 546, 2005.

English language abstract for DE 10 2004 053 167, 2006.

English language abstract for EP 0 033 529 A1, 1981.

English language abstract for FR 2 900 841 A1, 2007.

English language abstract for JP 61-129019, 1986.

English language abstract for JP 2-298767, 1990.

English language abstract for JP 4-268176, 1992.

English language abstract for JP 7-167521, 1995.

English language abstract for WO 93/13367, 1993.

English language abstract for WO 2009/098155, 2009.

English language translation of abstract for Rolker document, 2006.

U.S. Appl. No. 12/865,758, filed Aug. 2, 2010, Seiler.

U.S. Appl. No. 12/865,787, filed Aug. 2, 2010, Seiler.

Communication from the European Patent Office for counterpart European application EP 12 16 0549, 2012.

Translation of Office Action for corresponding Japanese patent application 2011-546858. 2012.

Galán, et al., "Solvent Properties of Functionalized Ionic Liquids for CO$_2$ Absorption," *IChemE* 85(A1):31-39 (2007).

Li, et al., "Correlation and Prediction of the Solubility of CO$_2$ and H$_2$S in an Aqueous Solution of 2-Piperidineethanol and Sulfolane," *Ind. Eng. Chem. Res.* 37:3098-3104 (1998).

Mitsubishi Heavy Industries, Ltd., "Flue Gas CO$_2$ Recovery Technology and Its Application to EOR: an Effective Strategy for Addressing the Issues of Global Warming and Peaking Oil Supply," vol. 44, p. 20-23 (2007).

English counterpart of Mitsubishi Heavy Industries, Ltd., "Flue Gas CO$_2$ Recovery Technology and Its Application to EOR: an Effective Strategy for Addressing the Issues of Global Warming and Peaking Oil Supply," vol. 44, p. 20-23 (2007).

U.S. Appl. No. 13/375,822, filed Dec. 2, 2011, Seiler.

Kim, et al., "Surface tension and viscosity of 1-butyl-3-methylimidazolium iodide and 1-butyl-3-methylimidazolium tetrafluoroborate, and solubility of lithium bromide+1-butyl-3-methylimidazolium bromide in water," *Korean J. Chem. Eng.* 23(1):113-116 (2006).

De Lucas, et al., "Vapor Pressures, Densities, and Viscosities of the (Water + Lithium Bromide + Lithium Formate) System and (Water + Lithium Bromide + Potassium Formate) System," *Journal of Chemical and Engineering Data, American Chemical Society, US* 48(1):18-22 (2003).

De Lucas, et al., "Absorption of Water Vapor into Working Fluids for Absorption Refrigeration Systems," *Industrial & Engineering Chemistry Research, American Chemical Society, US* 46(1):345-350 (2007).

English language abstract for WO 2008/015217 listed as document B2 above.

English language abstract for WO 2009/097930 listed as document B3 above.

English language abstract for WO 2012/062830 listed as document B4 above.

Preliminary Amendment filed Dec. 2, 2011 for copending U.S. Appl. No. 13/375,822.

Office Action mailed Dec. 6, 2012 for copending U.S. Appl. No. 13/589,169.

English translation of communication from the European Patent Office for counterpart European application EP 12 16 0549.

U.S. Appl. No. 13/641,591, Oct. 16, 2012, Seiler.

U.S. Appl. No. 13/641,692, Oct. 16, 2012, Seiler.

U.S. Appl. No. 13/675,979, Nov. 13, 2012, Rolker.

English language abstract for WO 2012/168067 listed as document B1 above.

English language abstract for WO 2012/168094 listed as document B2 above.

English language abstract for WO 2012/168095 listed as document B3 above.

* cited by examiner

$CO_2$ ABSORPTION FROM GAS MIXTURES USING AN AQUEOUS SOLUTION OF 4-AMINO-2,2,6,6-TETRAMETHYLPIPERIDINE

CROSS REFERENCE TO RELATED APPLICATIONS

The present application is US national stage of international application, PCT/EP2010/051083 which had an international filing date of Jan. 29, 2010, and which was published in German under PCT Article 21(2) on Aug. 12, 2010. Priority is claimed to German application DE 10 2009 000 543.9, filed on Feb. 2, 2009.

TECHNICAL FIELD

The invention relates to a method for the absorption of $CO_2$ from a gas mixture and also to absorption media and a device for carrying out the method.

The absorption of $CO_2$ from a gas mixture is of particular interest for the removal of carbon dioxide from flue gases, especially for reduction of the emission of carbon dioxide, which is considered to be the main cause of what is known as the greenhouse effect, from power plant processes. Furthermore, carbon dioxide is required for some processes and using the method according to the invention carbon dioxide can be provided as feedstock for these processes.

PRIOR ART

On the industrial scale, aqueous solutions of alkanolamines are typically used as absorption medium for the absorption of $CO_2$ from a gas mixture. The loaded absorption medium is regenerated by heating, expansion to a lower pressure or stripping, whereupon the carbon dioxide is desorbed. After the regeneration process the absorption medium can be reused. These methods are described, for example, in Rolker, J.; Arlt, W.; "Abtrennung von Kohlendioxid aus Rauchgasen mittels Absorption" [Elimination of carbon dioxide from flue gases by means of absorption] in Chemie Ingenieur Technik 2006, 78, pages 416 to 424.

These methods have the disadvantage that for the elimination of $CO_2$ by absorption and subsequent desorption a relatively large amount of energy is required and that during desorption only some of the absorbed $CO_2$ is desorbed again, so in one cycle of absorption and desorption the fraction of the alkanolamine used for the absorption of $CO_2$ is low. In addition, the absorption media used are highly corrosive and are subject to an interfering oxidative degradation in the absorption of $CO_2$ from oxygen-containing gas mixtures.

U.S. Pat. No. 7,419,646 describes a method for the deacidification of exhaust gases which uses an absorption medium which, during the absorption of the acidic gas, forms two phases which can be separated from one another. As a reactive compound for the absorption of an acidic gas, in column 6, inter alia, mention is made of 4-amino-2,2,6,6-tetramethylpiperidine. For the absorption of $CO_2$, U.S. Pat. No. 7,419,646 discloses, in column 3, lines 22 to 32, the use of N,N,N',N',N"-pentamethyldiethylenetriamine, N,N,N',N', N"-pentamethyldipropylenetriamine, N,N-bis(2,2-diethoxyethyl)methylamine and N,N-dimethyldipropylenetriamine as reactive compounds for absorption. The method of U.S. Pat. No. 7,419,646 has the disadvantage that additional apparatuses are required for separating the two phases which result from the absorption.

DD 266 799 describes a method for the purification of 4-amino-2,2,6,6-tetramethylpiperidine in which $CO_2$ is introduced into a solution of 4-amino-2,2,6,6-tetramethyl-piperidine in water and acetone and the salt which is precipitated is split again to $CO_2$ and 4-amino-2,2,6,6-tetramethylpiperidine by heating it to 90 to 200° C.

The use of ionic liquids for the absorption of $CO_2$ is described in X. Zhang et al., "Screening of ionic Liquids to Capture $CO_2$ by COSMO-RS and Experiments", AIChE Journal, Vol. 54, pages 2171 to 2728.

DESCRIPTION OF THE INVENTION

It has now surprisingly been found that the disadvantages of the known methods may be avoided by the use of 4-amino-2,2,6,6-tetramethylpiperidines for the absorption of $CO_2$, wherein the 4-amino-2,2,6,6-tetramethylpiperidine can be substituted by one or two alkyl moieties on the 4-amino group.

The invention therefore relates to a method for the absorption of $CO_2$ from a gas mixture by contacting the gas mixture with an absorption medium which comprises water and at least one amine of formula (I)

(I)

where $R^1$ and $R^2$ independently of one another are hydrogen or an alkyl moiety.

The invention also relates to an absorption medium which comprises an amine of formula (I), water and sulpholane, and also an absorption medium which comprises an amine of formula (I), water and an ionic liquid.

The invention further relates to a device for separating $CO_2$ from a gas mixture, said device comprising an absorption unit, a desorption unit and a circulating absorption medium which comprises water and an amine of formula (I).

In the method according to the invention, the absorption of $CO_2$ is performed by contacting a gas mixture with an absorption medium which comprises water and at least one amine of formula (I)

(I)

where $R^1$ and $R^2$ independently of one another are hydrogen or an alkyl moiety.

The method according to the invention can in principle be carried out using any gas mixture which contains $CO_2$, in particular with combustion exhaust gases; exhaust gases from biological processes such as composting processes, fermentations or sewage treatment plants; exhaust gases from calcination processes such as lime burning and cement production; residual gases from blast furnace processes of iron production; and also residual gases from chemical processes, such as exhaust gases of carbon black production or hydrogen production by steam reforming. Preferably, the gas mixture is a combustion exhaust gas, particularly preferably a combustion exhaust gas which contains from 1 to 60% by volume of $CO_2$, in particular from 2 to 20% by volume of $CO_2$. In a particularly preferred embodiment, the gas mixture is a combustion exhaust gas from a power plant process, in particular a desulphurized combustion exhaust gas from a power plant process. In the particularly preferred embodiment using a desulphurized combustion exhaust gas from a power plant process, use can be made of all desulphurization methods known for power plant processes, preferably gas scrubbing with milk of lime or according to the Wellmann-Lord method.

In the method according to the invention, the absorption medium comprises at least one amine of formula (I), where $R^1$ and $R^2$ independently of one another are hydrogen or an alkyl moiety. Preferred alkyl moieties are alkyl moieties having one to three carbon atoms, in particular methyl moieties. In a particularly preferred embodiment, $R^1$ and $R^2$ are hydrogen.

Amines of formula (I) can be produced from commercially available triacetonamine by reductive amination, i.e. by reacting triacetonamine with an amine of the formula $R^1R^2NH$ and hydrogen in the presence of a hydrogenation catalyst.

Methods for the reductive amination of triacetonamine are known to those skilled in the art from the prior art, for example from EP 0 033 529 for the production of the amine of formula (I) where $R^1$, $R^2$=H.

In the method according to the invention, the absorption medium also comprises water in addition to at least one amine of formula (I). Preferably, the weight ratio of water to amines of formula (I) in the absorption medium is in the range from 10:1 to 1:10, particularly preferably in the range from 5:1 to 1:1, and in particular in the range from 4:1 to 2:1. The absorption medium preferably comprises at least 5% by weight of amines of formula (I), particularly preferably at least 10% by weight, and in particular at least 25% by weight.

For the method according to the invention, all apparatuses suitable for contacting a gas phase with a liquid phase can be used to contact the gas mixture with the absorption medium. Preferably, gas scrubbers or absorption columns known from the prior art are used, for example membrane contactors, radial-flow scrubbers, jet scrubbers, Venturi scrubbers, rotary spray scrubbers, packed-bed columns, packing columns and tray columns. Particularly preferably, use is made of absorption columns in the countercurrent flow mode of operation.

In the method according to the invention, the absorption of $CO_2$ is preferably carried out at a temperature of the absorption medium in the range from 0 to 70° C., particularly preferably 20 to 50° C. When an absorption column is used in the countercurrent flow mode of operation, the temperature of the absorption medium is particularly preferably 30 to 60° C. at the entry into the column and 35 to 70° C. at the exit from the column.

The absorption of $CO_2$ is preferably carried out at a pressure of the gas mixture in the range from 0.8 to 50 bar, particularly preferably 0.9 to 30 bar. In a particularly preferred embodiment, the absorption is carried out at a total pressure of the gas mixture in the range from 0.8 to 1.5 bar, in particular 0.9 to 1.1 bar. This particularly preferred embodiment enables the absorption of $CO_2$ from the combustion exhaust gas of a power plant without compression of the combustion exhaust gas.

In the method according to the invention, the absorption medium can further contain one or more solvents in addition to water and at least one amine of formula (I).

Preferably, an absorption medium according to the invention, further comprises sulpholane, CAS No. 126-33-0, in addition to water and at least one amine of formula (I), preferably with a fraction of sulpholane of at least 5% by weight, particularly preferably at least 10% by weight, and in particular at least 25% by weight. The weight ratio of water to sulpholane in such an absorption medium is preferably in the range from 10:1 to 1:1, particularly preferably in the range from 5:1 to 2:1. The weight ratio of sulpholane to amines of formula (I) is preferably in the range from 3:1 to 1:3, particularly preferably 2:1 to 1:2.

In a further embodiment, an absorption medium according to the invention further comprises at least one ionic liquid in addition to water and at least one amine of formula (I), preferably with a fraction of ionic liquid of at least 5% by weight, particularly preferably at least 10% by weight, and in particular at least 25% by weight. The weight ratio of water to ionic liquid in such an absorption medium is preferably in the range from 10:1 to 1:1, particularly preferably in the range from 5:1 to 2:1. The weight ratio of ionic liquid to amines of formula (I) is preferably in the range from 3:1 to 1:10, particularly preferably 2:1 to 1:5.

An ionic liquid in the meaning of the invention is a salt of anions and cations or a mixture of such salts, wherein the salt or the mixture of salts has a melting point of below 100° C. Preferably, the ionic liquid consists of one or more salts of organic cations with organic or inorganic anions. Mixtures of a plurality of salts having different organic cations and identical anions are particularly preferred.

Suitable organic cations are, in particular, cations of the general formulae (II) to (VI):

  (II)

  (III)

  (IV)

  (V)

  (VI)

where
$R^1$, $R^2$, $R^3$, $R^4$, $R^5$, $R^6$ are identical or different and are hydrogen, a linear or branched aliphatic or olefinic hydrocarbon moiety having 1 to 30 carbon atoms, a cyclo-aliphatic or cycloolefinic hydrocarbon moiety having 5 to 40 carbon atoms, an aromatic hydrocarbon moiety having 6 to 40 carbon atoms, an alkylaryl moiety having 7 to 40 carbon atoms, a linear or branched aliphatic or olefinic hydrocarbon moiety, which is interrupted by one or more groups —O—, —NH—, —NR'—, —O—C(O)—, —(O)C—O—, —NH—C(O)—, —(O)C—NH—, —(CH$_3$)N—C(O)—, —(O)C—N(CH$_3$)—, —S(O$_2$)—O—, —O—S(O$_2$)—, —S(O$_2$)—NH—, —NH—S(O$_2$)—, —S(O$_2$)—N(CH$_3$)— or —N(CH$_3$)—S(O$_2$)—, and having 2 to 30 carbon atoms, a linear or branched aliphatic or olefinic hydrocarbon moiety which is functionalized in the terminal position by OH, OR', NH$_2$, N(H) R' or N(R')$_2$ and having 1 to 30 carbon atoms, or a polyether moiety of the formula —(R$^7$—O)$_n$—R$^8$ which is made up blockwise or randomly, wherein R$^5$ is not hydrogen for cations of the formula (VI),
R' is an aliphatic or olefinic hydrocarbon moiety having 1 to 30 carbon atoms,
R$^7$ is a linear or branched alkylene moiety containing 2 to 4 carbon atoms,
n is from 1 to 200, preferably 2 to 60,
R$^8$ is hydrogen, a linear or branched aliphatic or olefinic hydrocarbon moiety having 1 to 30 carbon atoms, a cycloaliphatic or cycloolefinic hydrocarbon moiety having 5 to 40 carbon atoms, an aromatic hydrocarbon moiety having 6 to 40 carbon atoms, an alkylaryl moiety having 7 to 40 carbon atoms or a moiety —C(O)—$R^9$, $R^9$ is a linear or branched aliphatic or olefinic hydrocarbon moiety having 1 to 30 carbon atoms, a cycloaliphatic or cycloolefinic hydrocarbon moiety having 5 to 40 carbon atoms, an aromatic hydrocarbon moiety having 6 to 40 carbon atoms or an alkylaryl moiety having 7 to 40 carbon atoms, X is an oxygen atom or a sulphur atom, and wherein at least one, and preferably each, of the moieties $R^1$, $R^2$, $R^3$, $R^4$, $R^5$ and $R^6$ is different from hydrogen.

Likewise suitable are cations of the formulae (II) to (VI) in which the moieties $R^1$ and $R^3$ together form a 4- to 10-membered ring, preferably 5- to 6-membered ring.

In the cations of the formula (V), the moieties $R^1$ to $R^5$ are preferably methyl groups and the moiety $R^6$ is preferably an ethyl group or an n-propyl group.

In the cations of the formula (VI), the moieties $R^1$ to $R^4$ are preferably methyl groups.

Likewise suitable are heteroaromatic cations having at least one quaternary nitrogen atom in the ring which bears a moiety $R^1$ as defined above, preferably derivatives of pyrrole, pyrazole, imidazole, oxazole, isoxazole, thiazole, isothiazole, pyridine, pyrimidine, pyrazine, indole, quinoline, isoquinoline, cinnoline, quinoxaline or phthalazine which are substituted on the nitrogen atom.

Suitable inorganic anions are, in particular, tetrafluoroborate, hexafluorophosphate, nitrate, sulphate, hydrogen-sulphate, phosphate, hydrogenphosphate, dihydrogen-phosphate, hydroxide, carbonate, hydrogencarbonate and the halides, preferably chloride.

Suitable organic anions are, in particular, $R^aOSO_3^-$, $R^aSO_3^-$, $R^aOPO_3^{2-}$, $(R^aO)_2PO_2^-$, $R^aPO_3^{2-}$, $R^aCOO^-$, $R^aO^-$, $(R^aCO)_2N^-$, $(R^aSO_2)_2N^-$, $NCN^-$, $R^b{}_3PF_3^-$ and $R^bBF_3^-$, wherein $R^a$ is a linear or branched aliphatic hydrocarbon moiety having 1 to 30 carbon atoms, a cycloaliphatic hydrocarbon moiety having 5 to 40 carbon atoms, an aromatic hydrocarbon moiety having 6 to 40 carbon atoms, an alkylaryl moiety having 7 to 40 carbon atoms or a linear or branched perfluoroalkyl moiety having 1 to 30 carbon atoms and $R^b$ is a perfluoroalkyl moiety having 1 to 30 carbon atoms, preferably 1 to 3 carbon atoms.

In a preferred embodiment, the ionic liquid comprises one or more 1,3-dialkylimidazolium salts, wherein the alkyl groups particularly preferably independently of one another are selected from methyl, ethyl, n-propyl, n-butyl and n-hexyl.

In a further preferred embodiment, the ionic liquid comprises one or more quaternary ammonium salts with a monovalent anion and cations of the general formula (II) where $R^1$ is an alkyl moiety having 1 to 20 carbon atoms, $R^2$ is an alkyl moiety having 1 to 4 carbon atoms, $R^3$ is a moiety $(CH_2CHRO)_n$—H where n is from 1 to 200 and R=H or $CH_3$ and $R^4$ is an alkyl moiety having 1 to 4 carbon atoms or a moiety $(CH_2CHRO)_n$—H where n is from 1 to 200 and R=H or is $CH_3$.

Methods for the production of the ionic liquids are known to those skilled in the art from the prior art.

In addition to water and at least one amine of formula (I), the absorption medium according to the invention can comprise both an ionic liquid and sulpholane.

In the method according to the invention, preferably the above-described absorption media according to the invention are used.

In the method according to the invention the absorption medium can contain, in addition to the above-mentioned components, also additives, preferably corrosion inhibitors and/or additives promoting wetting.

Corrosion inhibitors which can be used in the method according to the invention are all substances which are known to those skilled in the art as suitable corrosion inhibitors for methods for the absorption of $CO_2$ using alkanolamines, in particular the corrosion inhibitors described in U.S. Pat. No. 4,714,597.

Additives promoting wetting which are used are preferably one or more surfactants from the group of the nonionic surfactants, zwitterionic surfactants and cationic surfactants.

Suitable nonionic surfactants are alkylamine alkoxylates, amidoamines, alkanolamides, alkylphosphine oxides, alkyl-N-glucamides, alkyl glucosides, bile acids, alkyl alkoxylates, sorbitan esters, sorbitan ester ethoxylates, fatty alcohols, ethoxylated fatty acids, ester ethoxylates and polyether siloxanes.

Suitable zwitterionic surfactants are betaines, alkyl-glycines, sultaines, amphopropionates, amphoacetates, tertiary amine oxides and silicobetaines.

Suitable cationic surfactants are quaternary ammonium salts having one or two substituents having 8 to 20 carbon atoms, in particular corresponding tetraalkylammonium salts, alkylpyridinium salts, ester quats, diamidoamine quats, imidazolinium quats, alkoxyalkyl quats, benzyl quats and silicone quats.

In a preferred embodiment, the additive promoting wetting comprises one or more nonionic surfactants of the general formula $R(OCH_2CHR')_mOH$ with m from 4 to 40, where R is an alkyl moiety having 8 to 20 carbon atoms, an alkylaryl moiety having 8 to 20 carbon atoms or a polypropylene oxide moiety having 3 to 40 propylene oxide units and R' is methyl, or preferably hydrogen.

In a further preferred embodiment, the additive promoting wetting comprises a polyether-polysiloxane copolymer which contains more than 10% by weight of $[Si(CH_3)_2O]$ units and more than 10% by weight of $[CH_2CHR$—$O]$ units in which R is hydrogen or methyl. Particular preference is given to polyether-polysiloxane copolymers of the general formulae (VII) to (IX):

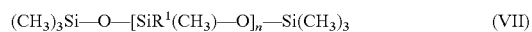
$(CH_3)_3Si$—$O$—$[SiR^1(CH_3)$—$O]_n$—$Si(CH_3)_3$      (VII)

$R^2O$-$A_p$-$[B$-$A]_m$-$A_q$-$R^2$      (VIII)

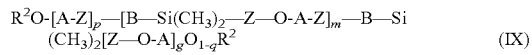
$R^2O$-$[A$-$Z]_p$—$[B$—$Si(CH_3)_2$—$Z$—$O$-$A$-$Z]_m$—$B$—$Si(CH_3)_2[Z$—$O$-$A]_gO_{1-q}R^2$      (IX)

where

A is a divalent moiety of the formula —$[CH_2CHR^2$—$O]_r$—,

B is a divalent moiety of the formula —$[Si(CH_3)_2$—$O]_s$—,

Z is a divalent linear or branched alkylene moiety having 2 to 20 carbon atoms, and is preferably —$(CH_2)_3$—, n=1 to 30, m=2 to 100, p, q=0 or 1, r=2 to 100, s=2 to 100, from 1 to 5 of the moieties $R^1$ are moieties of the general formula —Z—O-A-$R^2$ and the remaining moieties $R^1$ are methyl, $R^2$ is hydrogen or an aliphatic or olefinic alkyl moiety or acyl moiety having 1 to 20 carbon atoms and $R^3$ is hydrogen or methyl.

The additives promoting wetting are already known to those skilled in the art from the prior art as additives for aqueous solutions and can be produced by methods known from the prior art.

In the method according to the invention, temperature and pressure in the absorption and also the composition of the absorption medium are preferably chosen in such a manner that the absorption medium is present as one phase after the absorption of $CO_2$, i.e. the absorption of $CO_2$ in the absorption medium does not lead to precipitation of a solid or separation of a second liquid phase. This preferred embodiment of the method according to the invention does not require any additional apparatuses for phase separation and can be carried out in the devices known from the prior art for the absorption of $CO_2$ using alkanolamines.

In a preferred embodiment of the method according to the invention, $CO_2$ absorbed in the absorption medium is desorbed again by increasing the temperature and/or decreasing the pressure and the absorption medium after this desorption of $CO_2$ is reused for the absorption of $CO_2$. By means of such a cyclic process of absorption and desorption, $CO_2$ can be separated off in whole or in part from the gas mixture and obtained separately from other components of the gas mixture.

Alternatively to increasing the temperature or decreasing the pressure, or in addition to a temperature increase and/or pressure reduction, desorption can also be carried out by stripping the $CO_2$-loaded absorption medium with a gas.

If, in the desorption of $CO_2$, water is additionally removed from the absorption medium, water can also be optionally added to the absorption medium before reuse for absorption.

All apparatuses known from the prior art for desorption of a gas from a liquid can be used for the desorption. Preferably, desorption is carried out in a desorption column. Alternatively, desorption of $CO_2$ can also be carried out in one or more flash evaporation stages.

In the case of desorption by raising the temperature, the desorption of $CO_2$ is preferably carried out at a temperature of the absorption medium in the range from 50 to 200° C., particularly preferably 80 to 150° C. The temperature in the desorption in this case is preferably at least 20° C., particularly preferably at least 50° C., above the temperature in the absorption.

In the case of desorption by reducing the pressure, the desorption of $CO_2$ is preferably carried out at a total pressure in the gas phase in the range from 0.01 to 10 bar, in particular 0.1 to 5 bar. The pressure in the desorption in this case is preferably at least 1.5 bar, particularly preferably at least 4 bar, below the temperature in the absorption.

In the case of desorption by raising the temperature, the pressure in the desorption of $CO_2$ can also be higher than in the absorption of $CO_2$. In this embodiment the pressure in the desorption of $CO_2$ is preferably up to 5 bar, particularly preferably up to 3 bar, above the pressure in the absorption of $CO_2$. Using this embodiment, the $CO_2$ separated from the gas mixture can be compressed to a higher pressure than that of the gas mixture without using mechanical energy.

A device according to the invention for separating $CO_2$ from a gas mixture comprises an absorption unit, a desorption unit and a circulating absorption medium according to the invention. The apparatuses described above for the absorption in a method according to the invention are suitable as absorption unit of the device according to the invention. The apparatuses described above for the desorption in a method according to the invention are suitable as desorption unit of the device according to the invention. Preferably, the device according to the invention comprises an absorption unit and a desorption unit as are known to those skilled in the art of devices for separating $CO_2$ from a gas mixture with the use of an alkanolamine.

The method according to the invention and the absorption media according to the invention enable, by the use of at least one amine of formula (I) in the absorption medium, a higher degree of loading of the absorption medium with $CO_2$ in the absorption, wherein the degree of loading in the meaning of the invention denotes the molar ratio of $CO_2$ to amine in the absorption medium, compared with the known methods and absorption media, in particular compared with the industrially most used alkanolamines. Furthermore, the absorption medium of the method according to the invention is less corrosive, less toxic and shows a higher chemisorption rate for $CO_2$ and a lower oxidative breakdown with oxygen than absorption media which contain alkanolamines. Furthermore, in the embodiment of a cyclic process of absorption and desorption, compared with the known methods and absorption media, in particular compared with alkanolamines, an improved carbon dioxide differential is achieved, wherein the carbon dioxide differential in the meaning of the invention is the difference between the degree of loading of the absorption medium with $CO_2$ after the absorption of $CO_2$ and the degree of loading of the absorption medium with $CO_2$ after the desorption of $CO_2$. These advantages enable a more effective absorption of $CO_2$ from gas mixtures having a low $CO_2$ partial pressure, and also a decrease in size of the apparatuses and a lowering of the energy consumption compared with the methods known from the prior art. Furthermore, because of the lower corrosivity a lower amount of corrosion inhibitors is required in the method according to the invention than in the known methods.

Absorption media according to the invention which, in addition to water and an amine of formula (I), also contain sulpholane exhibit a further improved carbon dioxide differential, in particular in a method having desorption of the $CO_2$ by temperature increase.

Using absorption media according to the invention which, in addition to water and an amine of formula (I), also contain at least one ionic liquid, the desorption of $CO_2$ may be carried out at higher temperatures and/or lower pressures without a loss of solvent or, due to the evaporation of water, a precipitation of solid or a phase separation of the absorption medium occurring in the desorption.

The examples hereinafter clarify the invention, but without limiting the subject matter of the invention.

EXAMPLES

Example 1

In an apparatus for measuring gas-liquid equilibria which is thermostated and provided with a pressure controller, a mixture of 30% by weight of 4-amino-2,2,6,6-tetramethylpiperidine and 70% by weight of water was charged at constant temperature and brought into contact with gaseous carbon dioxide at a constant pressure, wherein pressure and temperature were varied. After reaching the equilibrium state, in each case the content of absorbed $CO_2$ in the loaded absorption medium was determined and the degree of loading was calculated therefrom as molar ratio of $CO_2$ to amine in the loaded absorption medium. The studied temperatures and pressures and the degrees of loading determined therefor are summarized in Table 1.

Example 2

Example 1 was repeated using a mixture of 30% by weight of 4-amino-2,2,6,6-tetramethylpiperidine, 35% by weight of sulpholane and 35% by weight of water.

Example 3

Comparative Example

Example 1 was repeated using a mixture of 30% by weight of monoethanolamine (MEA) and 70% by weight of water.

From the degrees of loading result the carbon dioxide differentials listed in Table 2 for absorption and desorption at 1.5 bar and a desorption by temperature rise from 40 to 120° C. and the carbon dioxide differentials listed in Table 3 for absorption and desorption at 120° C. and a desorption by pressure reduction from 1.5 to 0.8 bar.

TABLE 1

| Example | Pressure [bar] | Temperature [° C.] | Degree of loading [mole of $CO_2$/mole of amine] |
|---|---|---|---|
| 1 | 1.5 | 40 | 1.20 |
| 1 | 3.0 | 40 | 1.29 |
| 1 | 0.8 | 120 | 0.35 |
| 1 | 1.5 | 120 | 0.64 |
| 2 | 1.5 | 40 | 1.21 |
| 2 | 3.0 | 40 | 1.29 |
| 2 | 0.8 | 120 | 0.35 |
| 2 | 1.5 | 120 | 0.49 |
| 3* | 1.5 | 40 | 0.63 |
| 3* | 3.0 | 40 | 0.70 |
| 3* | 0.8 | 120 | 0.39 |
| 3* | 1.5 | 120 | 0.41 |

*not according to the invention

TABLE 2

| Example | Carbon dioxide differential [mole of $CO_2$/mole of amine] |
|---|---|
| 1 | 0.56 |
| 2 | 0.72 |
| 3* | 0.22 |

*not according to the invention

TABLE 3

| Example | Carbon dioxide differential [mole of $CO_2$/mole of amine] |
|---|---|
| 1 | 0.29 |
| 2 | 0.14 |
| 3* | 0.02 |

*not according to the invention

The invention claimed is:

1. An absorption medium for the absorption of $CO_2$ from a gas mixture, comprising water, sulpholane and at least one amine of formula (I)

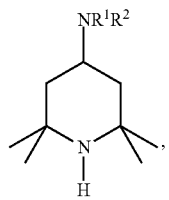

(I)

where $R^1$ and $R^2$ independently of one another are hydrogen or an alkyl moiety.

2. The absorption medium of claim 1, comprising water and sulpholane in a weight ratio of from 10:1 to 1:1.
3. The absorption medium of claim 1, comprising sulpholane and amines of formula (I) in a weight ratio of from 3:1 to 1:3.
4. The absorption medium of claim 1, wherein, in formula (I), $R^1$ and $R^2$ are hydrogen.
5. The absorption medium of claim 1, comprising water and amines of formula (I) in a weight ratio of from 10:1 to 1:10.
6. The absorption medium of claim 1, comprising at least 5% by weight of amines of formula (I).
7. A method for the absorption of $CO_2$ from a gas mixture by contacting the gas mixture with an absorption medium according to claim 1.
8. The method of claim 7, wherein the gas mixture is a combustion exhaust gas.
9. The method of claim 7, wherein the absorption medium is present as one phase after the absorption of $CO_2$.
10. The method of claim 7, wherein $CO_2$ absorbed in the absorption medium is desorbed by increasing temperature and/or decreasing pressure and the absorption medium after this desorption of $CO_2$ is reused for the absorption of $CO_2$.
11. The method according of 10, wherein the absorption is carried out at a temperature in the range from 0 to 70° C. and the desorption at a higher temperature in the range from 50 to 200° C.
12. The method of claim 10, wherein the absorption is carried out at a pressure in the range from 0.8 to 50 bar and the desorption at a lower pressure in the range from 0.01 to 10 bar.
13. The method of claim 11, wherein the absorption is carried out at a pressure in the range from 0.8 to 50 bar and the desorption at a lower pressure in the range from 0.01 to 10 bar.
14. A device for separating $CO_2$ from a gas mixture, said device comprising an absorption unit, a desorption unit and a circulating absorption medium, wherein said absorption medium comprises water, sulpholane and at least one amine of formula (I):

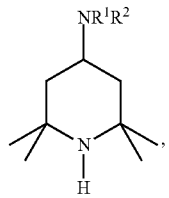

(I)

where $R^1$ and $R^2$ independently of one another are hydrogen or an alkyl moiety.

15. The device of claim 14, wherein said absorption medium comprises water and sulpholane in a weight ratio of from 10:1 to 1:1.

16. The device of claim 14, wherein said absorption medium comprises sulpholane and amines of formula (I) in a weight ratio of from 3:1 to 1:3.

17. The device of claim 14, wherein, in formula (I), $R^1$ and $R^2$ are hydrogen.

18. The device of claim 14, wherein said absorption medium comprises water and amines of formula (I) in a weight ratio of from 10:1 to 1:10.

19. The device of claim 14, wherein said absorption medium comprises at least 5% by weight of amines of formula (I).

* * * * *